United States Patent [19]

Weiner

[11] Patent Number: 5,027,103
[45] Date of Patent: Jun. 25, 1991

[54] ARRANGEMENT FOR VISUALLY INDICATING THE READINESS OF A VEHICLE ALARM SYSTEM

[75] Inventor: Hans Weiner, Mühlacker, Fed. Rep. of Germany

[73] Assignee: Dr. Ing. h.c.F. Porsche AG, Fed. Rep. of Germany

[21] Appl. No.: 508,461

[22] Filed: Apr. 13, 1990

Related U.S. Application Data

[63] Continuation of Ser. No. 371,756, Jun. 27, 1989, abandoned.

[30] Foreign Application Priority Data

Jun. 25, 1988 [DE] Fed. Rep. of Germany ....... 3821561

[51] Int. Cl.$^5$ .............................................. B60Q 9/00
[52] U.S. Cl. .................................... 340/426; 340/457; 340/815.3; 340/425.5; 362/80
[58] Field of Search ............ 340/426, 457, 438, 425.5, 340/815.13; 362/80, 100; 307/10.2; 70/432, 434

[56] References Cited

U.S. PATENT DOCUMENTS

| | | |
|---|---|---|
| 2,339,170 | 1/1944 | Jacobs ............................ 340/438 X |
| 2,709,745 | 5/1955 | Sundt . |
| 2,904,671 | 9/1959 | Johnson ............................ 362/80 X |
| 3,144,643 | 8/1964 | Anderson ............... 200/DIG. 47 X |
| 3,309,664 | 3/1967 | Deutsch et al. ....................... 340/438 |
| 3,720,084 | 3/1973 | Ventre et al. ....................... 70/432 X |
| 3,755,661 | 8/1973 | Bouvrande ............. 200/DIG. 47 X |
| 3,943,352 | 3/1976 | May ....................................... 362/80 |
| 4,249,161 | 2/1981 | Mohnhaupt ......................... 340/457 |
| 4,337,454 | 4/1981 | Iwata . |

FOREIGN PATENT DOCUMENTS

| | | |
|---|---|---|
| 7603755 | 6/1976 | Fed. Rep. of Germany . |
| 2636099 | 2/1978 | Fed. Rep. of Germany . |
| 2848533 | 5/1980 | Fed. Rep. of Germany . |
| 8103775 | 2/1981 | Fed. Rep. of Germany . |
| 3607784 | 9/1987 | Fed. Rep. of Germany . |
| 8714628 | 11/1987 | Fed. Rep. of Germany . |
| 1050614 | 1/1954 | France . |
| 8202861 | 9/1982 | United Kingdom . |
| 8716500 | 12/1987 | United Kingdom . |

OTHER PUBLICATIONS

Citroen CX-Diesel, Model 1983, p. 2.
Electronics Australia, vol. 37, No. 4, Jul. 1975, pp. 52, 53, Sydney, Australia; P. Edwards; "LED Flasher Based on Inexpensive IC", p. 1, col. 3.
Wach-und Schliessgeseuschaft, Praxis & Hobby, pp. 70-73, *Funkschau*, 4-1985.

Primary Examiner—Joseph A. Orsino
Assistant Examiner—Brian R. Tumm
Attorney, Agent, or Firm—Evenson, Wands, Edwards, Lenahan & McKeown

[57] ABSTRACT

In order to visually indicate the readiness of a vehicle alarm system or the locked condition of a vehicle door, an electro-optical indicating element is inserted into the locking button of a vehicle locking system. The light-emitting diode, during the pulse operation, is operated with a no-pulse period which is relatively long in comparison to the flashing pulse.

11 Claims, 4 Drawing Sheets

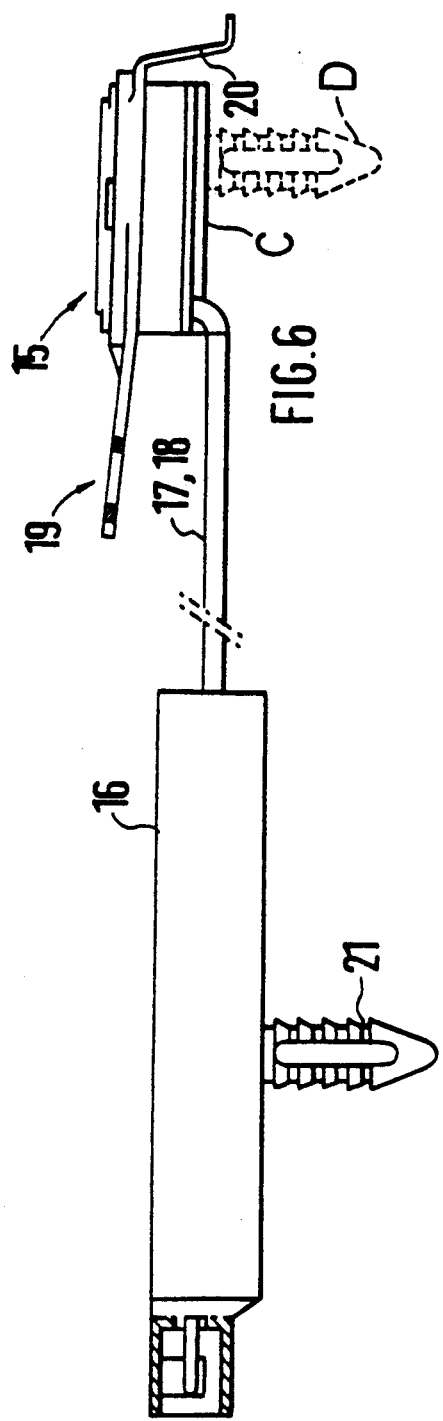
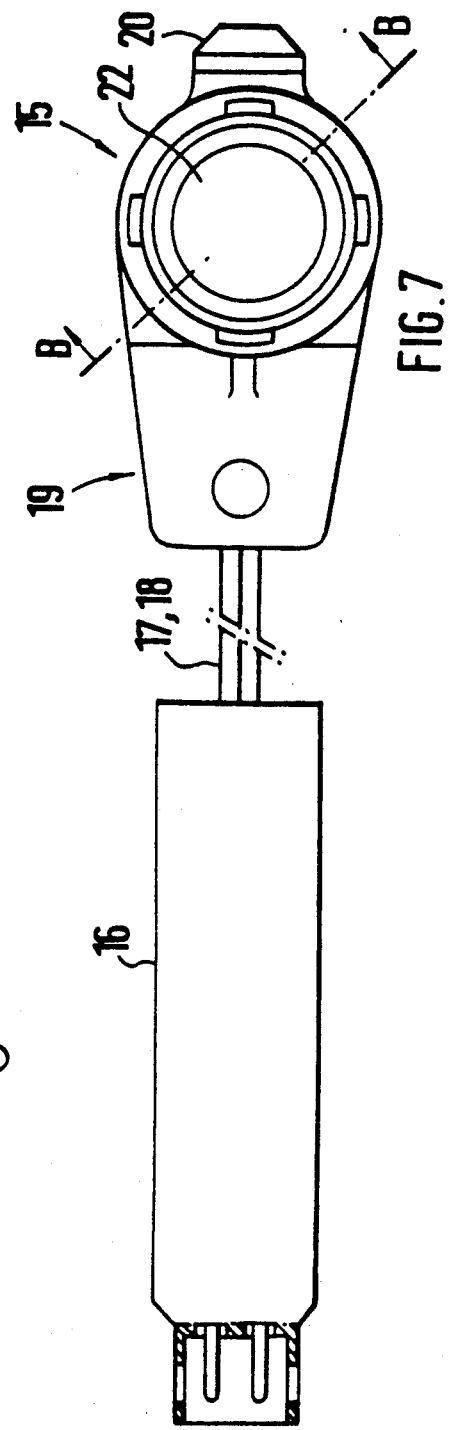
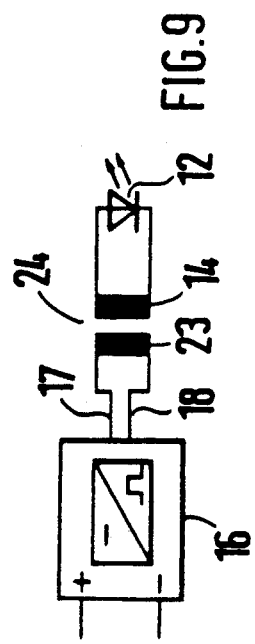
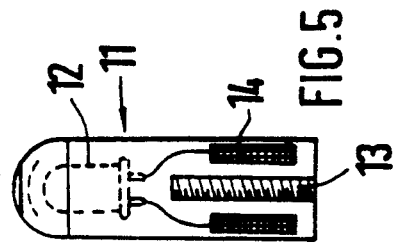
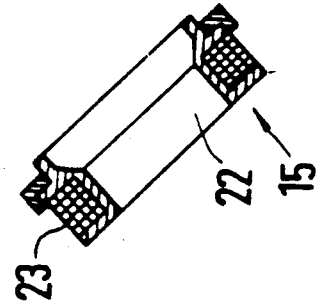

ARRANGEMENT FOR VISUALLY INDICATING THE READINESS OF A VEHICLE ALARM SYSTEM

This is a continuation, of application Ser. No. 07/371,756, filed June 27, 1989, now abandoned.

BACKGROUND AND SUMMARY OF THE INVENTION

The invention relates to an arrangement for the visual indication of the readiness of a vehicle alarm system or of the locked condition of a vehicle door, with an electro-optical indicating element, preferably a light-emitting diode, arranged in the area of a locking system of the vehicle being controlled by at least one switching contact actuated when the alarm system is set to be operative or when the vehicle door is locked.

When leaving the vehicle, a driver can often not recognize whether he has set an anti-theft alarm system so that it is ready to operate. This is particularly true in darkness when even the condition of a locking of a door-locking system cannot be tested without an additional gripping of the door lock handle.

For this reason, a light-emitting diode, which is visible from the outside of the vehicle, was installed in proximity of a locking button of the locking mechanism located on the inside of the door of a known motor vehicle (see "Operating Instructions of the Citroen CX Diesel Vehicle"—Model 83, Page 2).

It is also known from *Funkschau* 4, 1985, Pages 70 to 73, to indicate the condition of a vehicle alarm system, which is set to be ready to operate, by means of a flashing light-emitting diode.

However, these light-emitting diodes require a separate installation space on the upper side of the inside door panel. Also, special holding and fastening elements must be provided for the light-emitting diode which are capable of compensating the unavoidable tolerances between the inside door panel and its covering. In the case of the vehicle alarm system according to the *Funkschau* article, there is the additional problem of a relatively high power consumption of the light-emitting diode by the diode itself and the required multiplier.

It is therefore an object of the invention to provide a arrangement of the type referred to above which requires no separate installation space on an inside door panel of a vehicle door, is arranged at a mounting site which is connected with a locking system of a vehicle in a sensible manner and is largely independent of tolerances in the area of the installation site which are the result of manufacturing.

This object is achieved by providing an arrangement wherein the electro-optical indicating element is inserted into a locking button of the locking system.

The main advantages of the invention are that the arrangement may be integrated largely into an element (locking button) of a vehicle door which already exists and therefore does not require any additional installation space on an inside door panel. The mounting site is connected with a locking system of the motor vehicle in a sensible manner according to especially preferred embodiments. By means of a pulse operation of the indicating element with a pulse separation which is relatively long in comparison to the flashing pulse, a low power consumption is achieved, on the one hand, and, on the other hand, a multiplier is not required.

Other objects, advantages and novel features of the present invention will become apparent from the following detailed description of the invention when considered in conjunction with the accompanying drawings.

BRIEF DESCRIPTION OF THE DRAWINGS

FIG. 5 is a view of a locking button according to FIG. 1, but with a wireless power supply;

FIG. 6 is a view of a coil cradle with a power supply part for the wireless power supply of the light-emitting diode of the locking button constructed according to a preferred embodiment of the invention;

FIG. 7 is a top view of a coil cradle according to FIG. 6;

FIG. 8 is a sectional view of the coil cradle taken along line B—B of FIG. 7;

FIG. 9 is a diagram of connections according to FIG. 4, but with a wireless power supply;

DETAILED DESCRIPTION OF THE DRAWINGS

Figure 1:
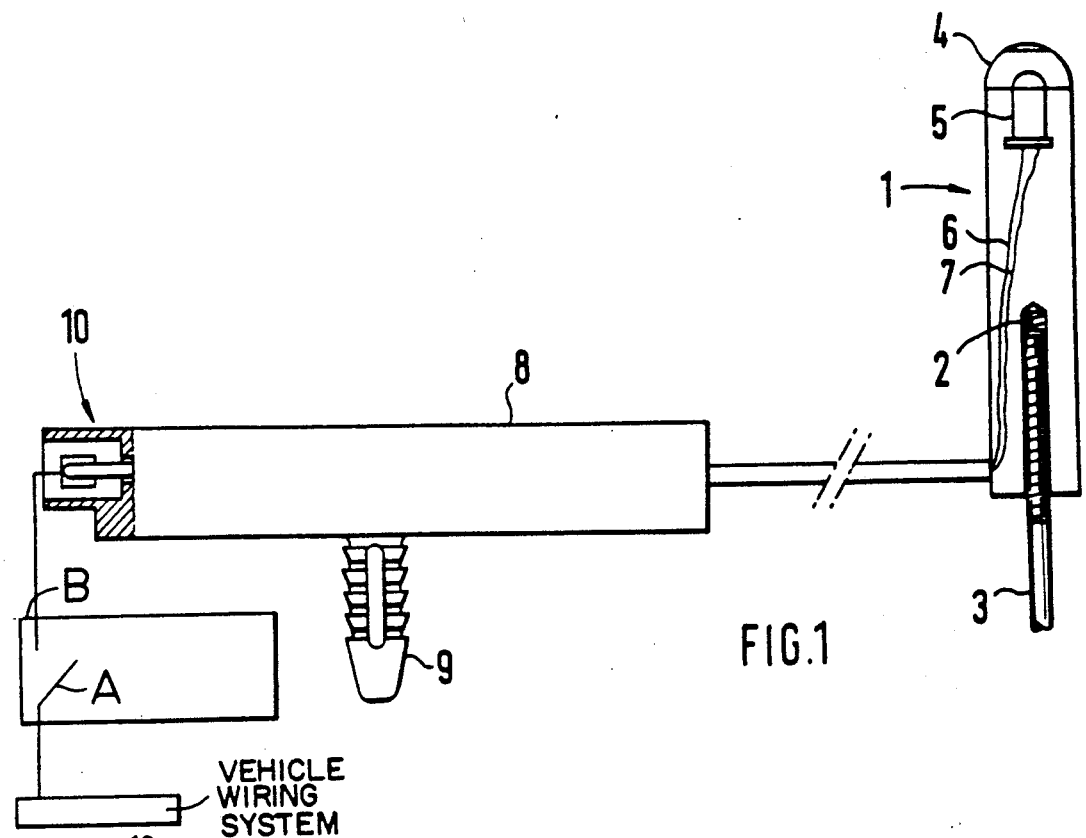
FIG. 1 is a schematic view of a locking button with a light-emitting diode of a vehicle locking system having a power supply part which is connected by means of electrical conducting wires constructed in accordance with a preferred embodiment of the invention.

In FIG. 1, reference number 1 shows a locking button. In a known manner, the locking button 1, at one of its lower ends, has a threaded bore 2, by means of which it is screwed on a locking bar 3 of a vehicle locking system which is not shown. On the end of the locking button which faces away from the end equipped with the threaded bore 2, the locking button 1 is made, at least in sections, of a transparent material 4, which can be illuminated by an electro-optical converter 5, such as a light-emitting diode (LED), which is arranged or cast into the locking button 1.

Finally, the LED 5 is connected with a power supply part 8 by means of a pair of electrical wires 6, 7 which, at the lower end, extend out of the locking button 1. This power supply part 8 may, for example, be fixed in a corresponding mounting opening inside the vehicle door (not shown) by means of a fastening bolt 9, which may be cast to the housing. The power supply part 8 finally has an electrical plug-type connection 10, by means of which the power supply part 8 can be connected to the vehicle wiring system by way of a switching contact A of the locking system or of an alarm system. In this case, the switching contact is closed when the locking system is locked or the alarm system is set to be ready to operate, so that the power supply part 8 is supplied with operating power.

Figure 2:
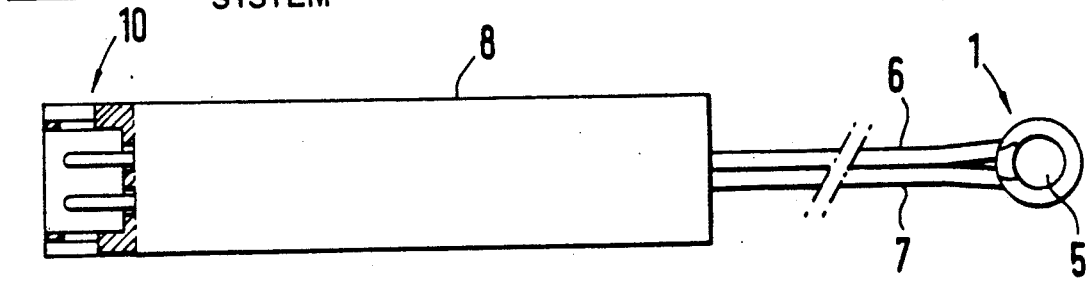
FIG. 2 is a top view of the arrangement according to FIG. 1.

FIG. 2 is a top view of the whole arrangement.

Figure 3:
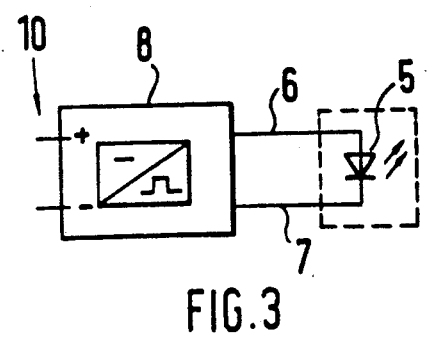
FIG. 3 is a diagram of electrical connections of the arrangement according to FIG. 1.
Figure 4:
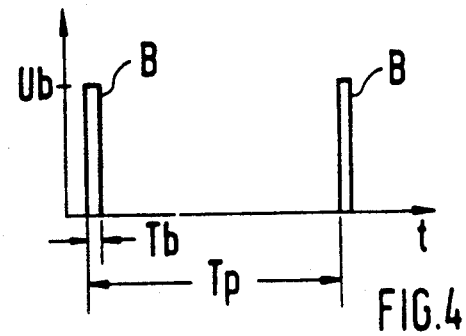
FIG. 4 is a pulse diagram of the output signal of the power supply part of FIG. 1.

FIG. 3 finally is a basic circuit diagram of the arrangement. The power supply part 8 consists essentially of a pulse generator which is known per se and which converts a direct voltage (vehicle wiring voltage Ub) present at its inputs 10 into a rectangular-pulse system of a defined pulse duration Tb (flashing pulses B) and no-pulse periods Tp (FIG. 4). For this purpose, for example, an astable multivibrator with a low power draw may be used to produce a timed, direct-voltage signal as shown in FIG. 4.

A respective pulse diagram is shown in FIG. 4. In this case, the pulse duration of the flashing pulses B, with respect to its time duration Tb, is selected such that it is adapted to the power draw of the LED, i.e., that, for example, a multiplier is not required. Thus, there is therefore no additional power loss at this type of an adapting element.

However, pulse durations Tb and no-pulse periods Tp are designed such that the flashing pulses are easily visible and have a sufficient repeat frequency. Typical values are, for example, 55 msec for the pulse duration Tb of the flashing pulses B and 1.5 sec for the no-pulse period Tp. The flashing pulse B itself may naturally also be decomposed into several start-up and shut-off pulses.

In FIG. 5, a locking button 11 is shown for the wireless power supply of the LED 12 arranged in the locking button 11. For this purpose, in the area of a threaded bore 13, for the screwing of the locking button 11 on a locking bar which is not shown, a coil (secondary coil 14) is arranged at the lower end of the locking button 11 (or is cast into the locking button 11) to which the LED 12 is electrically connected.

FIG. 6 finally shows a coil cradle 15 with a power supply part 16 which is essentially identical to the power supply part 8 according to FIG. 1. In this figure, the parts are shown in a side elevation, and in FIG. 7, they are shown as a vertical section. The coil cradle 15 and the power supply part 16 are connected with one another by a pair 17, 18 of wires. The coil cradle, by means of a lug 19 and a supporting element 20 can be fixed inside the vehicle door or alternatively by means of a clipping connection, a locking connection, a screwed connection, a glued connection C as shown in solid lines or a plug-in connection as shown in dashed lines and the power supply part 16 can be fixed by means of a fastening bolt 21. The coil cradle has a central bore 22 in which the locking button 11 extends in axial direction.

FIG. 8 is a sectional view of the coil cradle 15 in direction B—B with the opening 22 and cast-in integral primary coil 23 which is connected to the pair 17, 18 of wires and is used for the power supply of the LED 12 in the locking button 11.

FIG. 9 shows the electrical basic circuit diagram of the arrangement according to FIGS. 5 to 8. In a certain position of the locking button 11 relative to the coil cradle 15, which is shown in the following FIG. 10, the coils 14 and 23 are arranged concentrically with respect to one another so that a transformative operative connection (inductive coupling) exists between the primary coil 23 and the secondary coil 14 which is indicated by the transformer symbol 24. The pulses which are generated corresponding to FIG. 4 by the astable multivibrator (not shown) of the power supply part 16 are then transmitted by the primary coil 23 to the secondary coil 14 and by excitation cause the LED 12 to emit light.

Figure 10:
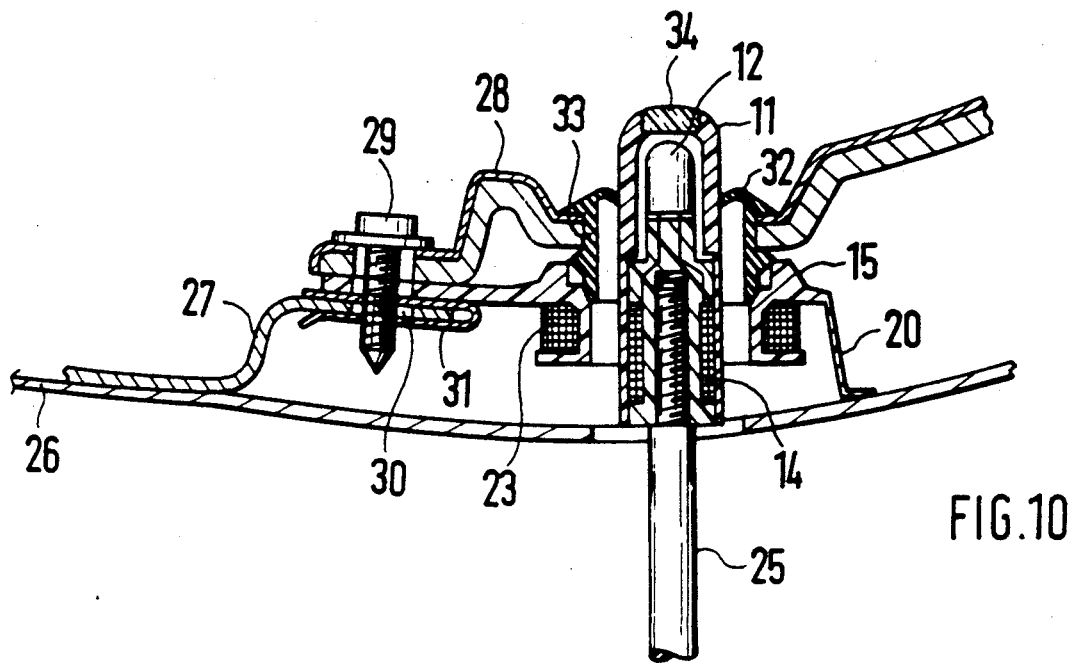
FIG. 10 is a sectional view of the locking button according to FIG. 5 in a locked position and of the coil cradle according to FIG. 6, installed into an inside door panel.
Figure 11:
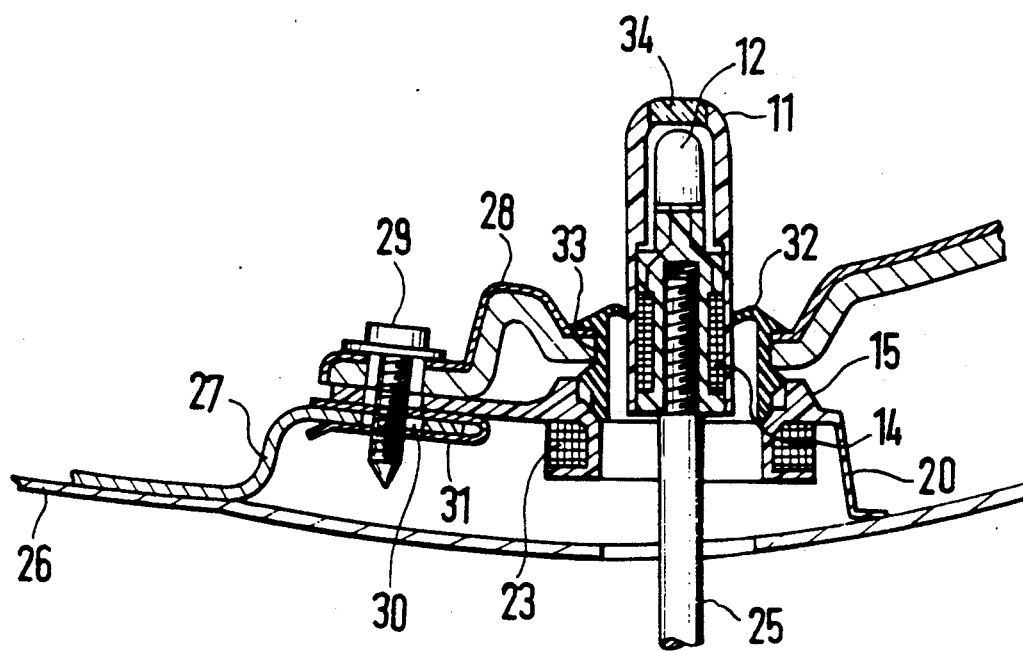
FIG. 11 is a sectional view of FIG. 10, but in a locked position.

FIGS. 10 and 11 finally are sectional views of a locking button 11 which, in a not shown locked position, is screwed on the locking bar 25, and of the coil cradle 15 in the installed condition. A part of an inside door panel has the reference number 26, a holding angle 27 being fastened (welded) to this inside door panel. The coil cradle 15 and a covering part 28 are screwed together with the holding angle 27 by means of a screw 29 and a sheet-metal nut 31 which is fitted in the holding angle 27 by means of a bore 30. Alternatively, a glued connection can be employed by means of the supporting element 20, the coil cradle supports itself with respect to the inside door panel 26. The locking button 11 finally extends through an elastic sleeve 32 and is held in position with respect to the coil cradle and an opening in the covering part 33. The sleeve 32, in this case, permits a compensating of manufacturing and mounting tolerances, particularly between the inside door panel 26 and the covering part 28.

In the retracted condition of the locking button 11 shown in FIG. 10 which shows the locked condition of the locking system of the vehicle door, the coils 23 and 14 are concentric with respect to one another, so that an inductive coupling exists between the coils 23 and 14, and thus power can be transmitted transformatively from the primary coil 23 to the secondary coil 14, and the light-emitting diode 12 can be excited to emit light. A checking of whether the vehicle door is locked properly or whether the alarm system is set to be ready to operate can therefore take place by day as well as by night.

If, however, the vehicle door is unlocked, the locking button 11, in the manner that is shown in FIG. 11, projects clearly visibly beyond the covering part 28. It is recognizable that the pair of coils will then be noticeably offset with respect to one another: Thus an inductive coupling between the primary coil 23 and the secondary coil 14 will not longer exist (or it is so weak that it is no longer sufficient for a control of the LED). This has the advantage that, even in the case of a malfunctioning of the locking or alarm system (for example, control of the power supply part 16), when the door is unlocked, a visual acknowledgment cannot take place.

As a alternative to the constructions of the locking buttons according to FIGS. 1 and 4, in the manner shown in FIGS. 10 and 11, also only one disk-shaped part 34 made of transparent plastic which permits the passing-through of the light from the light-emitting diode 12 may be provided, while the remaining part of the locking button is constructed of a non-translucent material.

Figure 12:
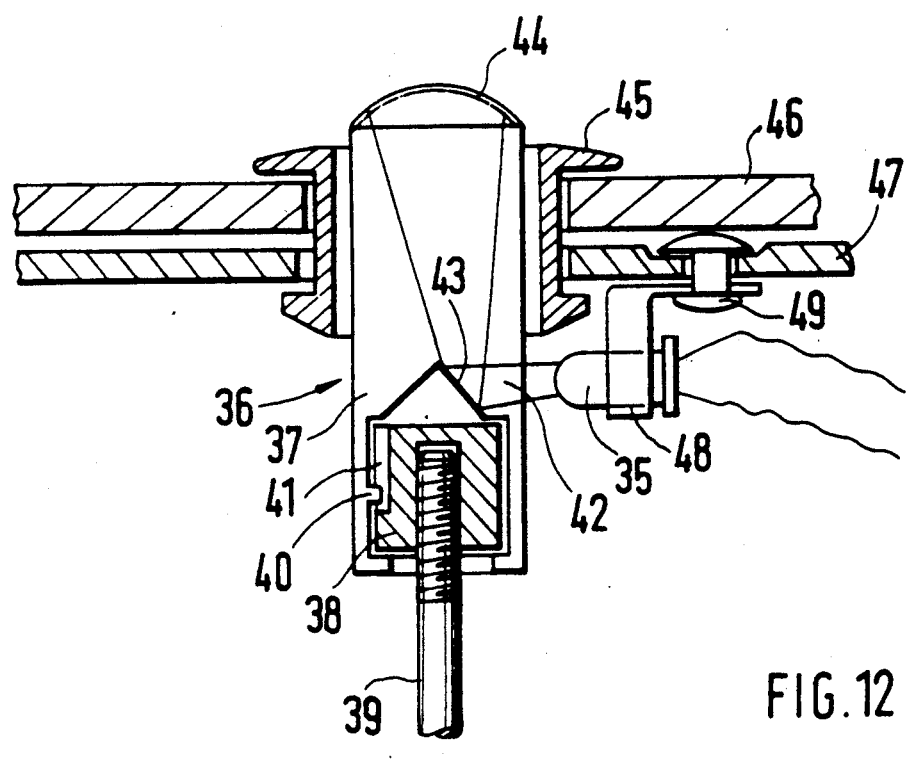
FIG. 12 is a sectional view of FIG. 10, but for an arrangement with a changed construction.

Another embodiment of the signal emission of an electro-optical transducer (LED 35) by way of a locking button 36 is shown in FIG. 12. The locking button 36 consists of two parts and specifically of a transparent part 37 and of a threaded part 38 which is screwed on a locking bar 39 of a (not shown) locking system. The transparent part 37 is clipped together with the threaded part 38 and, by means of a lug 40, which engages in a corresponding indentation 41 in the threaded part 38, is secured against rotation.

The transparent part 37, above the receiving space for the threaded part 38, is drilled hollow in a conical shape (or in a spherical shape) and preferably is metal-coated with reflective coating. A prism may also be inserted there. As a result, it is achieved that in the shown retracted condition of the locking button 36, the light radiation 42 emitted by the LED 35 is reflected upward at the conical surface 43 and becomes visible at the corrugated or roughened surface 44 of the locking button 36.

Finally, the locking button 36 is held in position with respect to a covering part 46 and an inside door panel 47 by means of a collar 45. The LED 35 may, for example, by means of a simple holder 48 which encloses the LED 35 at least partially, be fastened to the inside door panel 47 (for example, by means of a rivet 49). As in the manner shown in FIGS. 1 to 4, the LED may also be supplied with power by means of a corresponding power supply part.

A signal can be generated only in the shown position of the locking button 36. If, on the other hand, the locking button 36 partially projects beyond the covering part 46 (low edge of the locking button 36 at the level of the lower edge of the collar 45, unlocked door), the light path between the LED 35 and the corrugated surface 44 is interrupted.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for the visual indication of the readiness of a vehicle alarm system or of the locked condition of a vehicle door, comprising: an electro-optical indicating element arranged in the area of a locking system of the vehicle being controlled by at least one switching contact actuated when the alarm system is set to be operative or when the vehicle door is locked, wherein the electro-optical indicating element is inserted into a locking button of the locking system, and
    electronic power supply means for supplying power wirelessly to the electro-optical indicating element, said electronic power supply means including a pair of coils,
    wherein the electro-optical indicating element is operable to flash in a flashing mode with a no-pulse period which is relatively long in comparison to the duration (Tb) of a flashing pulse (b).

2. An arrangement according to claim 1, wherein a timed direct-voltage signal is generated by said electronic power supply means, the timed direct-voltage signal being supplied to the electro-optical indicating element when the switching contact is operated.

3. An arrangement according to claim 2, wherein the electro-optical indicating element is a light-emitting diode and timing of the timed direct-voltage signal is adapted to the power consumption of the light-emitting diode.

4. An arrangement according to claim 1, wherein a coil cradle or an electronic unit is fastened to the vehicle door by means of one of a clipped connection, locking connection, screwed connection, plug-in connection and glued connection.

5. An arrangement according to claim 1, wherein the supplying of power to the electro-optical indicating element takes place via the pair of coils by means of a timed direct-voltage signal.

6. An arrangement according to claim 1, wherein a first coil of the pair of coils is inserted into a coil cradle which is ring-shaped at least in sections, and is inserted in an inside door panel or a covering part of the inside door panel of the vehicle door or is fastened at the inside door panel or the covering part, and wherein a second coil of the pair of coils is inserted into the locking button such that both coils in the case of a locked locking system, are approximately concentric with respect to one another.

7. An arrangement for the visual indication of both the readiness of a vehicle alarm system and of the locked condition of a vehicle door, with an electro-optical indicating element arranged in the area of a locking system of the vehicle being controlled by at least one switching contact actuated when the alarm system is set to be operative and when the vehicle door is locked, wherein a signal of the electro-optical indicating element is emitted by way of a locking button of the locking system which consists at least in sections of a transparent material, the locking button when the vehicle door is locked or the locking button is retracted, being acted upon by light radiation in a radial direction by the electro-optical indicating element arranged in the hollow space of the vehicle door, said light radiation, in the locking button being deflected in an axial direction to a top side of the locking button, said arrangement including means for interrupting a light path between the electro-optical indicating element and the sections of transparent material when the vehicle door is unlocked or the locking button is not retracted.

8. An arrangement according to claim 7, wherein for the deflection of the light radiation, the part of the locking button which consists of a transparent material being drilled conically hollow at the end opposite the top side of the locking button to form a conical reflector surface.

9. An arrangement according to claim 8, wherein the conical reflector surface is metal-coated with a reflective coating.

10. An arrangement according to claim 7, wherein the locking button is constructed in two parts and has a transparent part which is part of the transparent material of the locking button and a threaded part which are clipped together and are secured against rotation by means of a lug shaped onto the transparent part which corresponds to a respective indentation in the threaded part.

11. An arrangement according to claim 7, wherein a prism inserted in the locking button deflects the light radiation.

* * * * *